United States Patent Office 3,498,954
Patented Mar. 3, 1970

3,498,954
POLYMERS CONTAINING UREA AND/OR BIURET LINKAGES AND PROCESSES FOR THEIR PRODUCTION
Perry A. Argabright, Vernon J. Sinkey, and Brian L. Phillips, Littleton, Colo., assignors to Marathon Oil Company, Findlay, Ohio, a corporation of Ohio
No Drawing. Filed Oct. 21, 1966, Ser. No. 588,292
Int. Cl. C08g 22/02
U.S. Cl. 260—77.5                    20 Claims

ABSTRACT OF THE DISCLOSURE

Polymers containing biuret and urea functional groups are prepared by reacting a metal cyanate with an organic polyhalide and water in an aprotic solvent.

---

The present invention relates to new polymers which contain urea and biuret linkages, and to processes for their production.

The durability and versatility of polyureas is well known and the polymers of the present invention are readily conventionally incorporated into a variety of polyurea and biuret-containing coatings, fibers, films, castables and other formulations. The present invention, through new techniques, produces compositions hitherto unavailable which contain either urea or biuret linkages or both. Further, the processes of the present invention permit the production of these new chemical compositions in a single step reaction with no product purification steps required other than simple filtration and recovery of solvent. The entire product mixture can be further reacted to form valuable new coating formulations, elastomers and thermosetting compositions.

According to the present invention polyfunctional halides ($RX_m$) are reacted with a metal cyanate $$(M(NCO)_n)$$

and water in an aprotic solvent to give a polymer containing urea and/or biuret groups, wherein R is an alkyl or aralkyl group or their substituted derivatives and preferably a difunctional group, for example,

—$n=3$ to 20

—$CH_2CH=CHCH_2$—

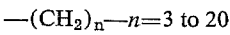

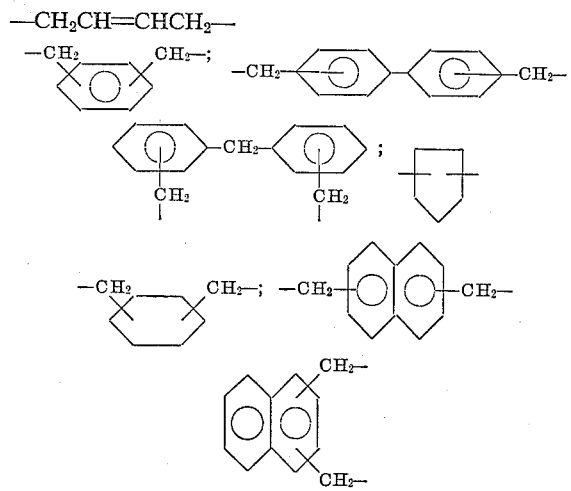

or hydrogenated derivatives thereof. M is an alkali or alkaline earth metal, for example, Li, Na, K, Cs, Rb, Be, Mg, Ca.

By aprotic solvents is meant compositions which are liquid under the conditions of the reaction, which have a high dielectric constant (greater than about 15 at 25° C.), which are dipolar, that is, one part of the molecule has a more positive electrical charge relative to the other parts of the molecule causing the molecule to act as a dipole, are sufficiently inert not to enter into deleterious side reactions to a significant degree under the reaction conditions, and which do not possess hydrogen atoms capable of hydrogen bonding with, or transferring to, anions in solution in the reaction mixture. The aprotic solvent can be composed of a mixture of liquids so long as the over-all liquid compositions meet the above criteria.

The preferred aprotic solvents for the practice of the present invention are N,N-dialkylamines, e.g., dimethylformamide, diethylacetamide, N-alkylpyrrolididones, e.g., N-methylpyrrolidones, and N-butylpyrrolidones. Hexasubstituted phosphoramides, e.g. hexamethylphosphoramide; tetra-substituted ureas, e.g., tetramethylurea, and N,N-dimethyl, N,N'-dipropyl urea; sulfoxides, e.g. dimethylsulfoxide, and diphenylsulfoxide; sulphones, e.g., dimethylsulphone, tetramethylenesulphone, nitriles, e.g., acetonitrile, benzonitrile. The most preferred solvent for the purposes of the present invention is dimethylformamide.

Preferably from 1 to 10 liters of aprotic solvent will be present for each mole of dihalide in the reaction zone.

In general, there will preferably be present in the reaction mixture from 0.05 to about 5, and more preferably from 0.5 to about 2.0 mole of cyanate groups in the form of metal cyanate for each mole of halogen groups present in the form of polyfunctional halides.

By halide is meant herein a molecule which contains at least two, and preferably an average of about 1.8 to about 2.2 halide groups per molecule and in which the halide groups are chosen from iodines, bromines, and chlorines, with the latter being most preferred.

In general, there will preferably be present in the reaction mixture from 0.5 to about 10.0, and more preferably from 1.0 to about 5.0 moles of water for each mole of halogen groups present in the form of polyfunctional halides.

More reactive halides, for example allylic and benzylic halides, in general, tend to give polymers containing both biuret and urea groups. Aliphatic halides give predominately urea linkages with a small amount of chain-terminated mono-substituted urea groups.

In general, the usual product of the present invention thus comprises molecules which contain the urea group and the biuret group. When the preferred p-xylylene dichloride is utilized in the present invention the mole ratio of urea groups to biuret groups is approximately 2.

While R groups of various sizes may be employed, those having from 2 to 20 and especially those having from 4 to 16 carbon atoms are preferred. The preferred products of the present invention will contain at least about 0.1 weight percent of urea groups and at least about 0.1 weight percent of biuret groups. The total weight percentage of urea and biuret groups in the product compounds will preferably be from about 10 to 75 and more preferably from about 30 to about 60 percent by weight based on the total weight of the product compounds.

The reactions of the present invention are preferably conducted at a temperature of from about 25 to about 300° C. and most preferably at from 50 to about 150° C. Pressure is not critical and may be from below one atmosphere to over 10,000 p.s.i.g. Reaction time is similarly not critical, but may range from about one minute to about one hundred hours with reaction times from about thirty minutes to about ten hours being more preferred. In general, the reaction will be continued until substantially all of the organic halide has been reacted as determined by conventional polarographic analysis. In most cases, it will be preferable to conduct the reaction anaerobically on a batch-type basis, although flow systems may be utilized. The most convenient apparatus will in most cases, be a conventional tight-lid varnish cooker or similar reactor having a reflux condensor, provision for agitation, and the usual controls for temeprature and pressure.

Films, fibers, etc. can be conventionally prepared by dissolving the polymers of the present invention in suitable solvents, e.g. the above named aprotic solvents.

The present invention will be more fully understood by reference to the examples which follow. These examples are to be taken as merely illustrative of certain embodiments of the invention and the claims appended hereto are to be considered as including all of the obvious variations and modifications to which the invention is adaptable which would be obvious to persons skilled in the art from a reading of the present specification. For example, the various R groups may contain organic substituents so long as they do not interfere with the reactions of the present invention, e.g. by steric hinderance or undesirable side reactions.

Example I

The apparatus used in this and all of the following examples comprises a 3-necked round bottom glass reactor equipped with paddle type stirrer, reflux condenser terminated with an adapter to maintain a nitrogen atmosphere in the reactor, thermometer and thermoregulator. The reactor is heated by means of a mantle.

A mixture of 0.1 mole p-xylylene dichloride, 0.3 mole KOCN, 1.0 mole $H_2O$ in 340 g. DMF are heated under $N_2$ at 100° C. for two hours. The cooled reaction mixture is filtered and the DMF insolubles are stirred with water to give 15.3 g. of a solid which does not melt below 300° C. An additional 3.2 g. is recovered from the DMF/filtrate by adding water. Total yield is 18.5 g. (125% of theory for conversion to polyurea). The IR spectra of both fractions are identical and indicate both urea and biuret groups are present.

Example II

The procedure of Example I is repeated using 0.1 mole 1,4-dichloro-2-butene in place of the xylylene dichloride. Isolated from the DMF insoluble is 3.5 g. of a solid organic product. An additional 10.6 g. is isolated as DMF soluble. Total yield is 14.1 g. or 168% of theory for conversion to polyurea. The IR spectra or both fractions are the same and indicate that both urea and biuret groups are present.

Example III

The procedure of Example I is repeated using 0.1 mole 1,4-dichlorobutane in place of the xylylene dichloride and running at 100° C. for seventeen hours. All polymer produced is DMF soluble and amounts to 9.9 g. (115% of theory for conversion to polyurea). The IR spectrum of the product shows the urea group to be the predominant linkage. Biuret groups are present, but to a lesser extent than found in the products of Examples I and II.

What is claimed is:

1. A process for the preparation of polymers containing biuret and urea functional groups, comprising reacting a metal cyanate with an organic polyhalide, and water in an aprotic solvent.

2. The process of claim 1 wherein the reaction is conducted at a temperature of from about 25 to 300° C.

3. The process of claim 1 wherein the polyfunctional organic chloride comprises a substantial portion of p-xylylene dichloride.

4. The process of claim 1 wherein the metal cyanate is an alkali metal cyanate.

5. The process of claim 1 wherein the metal cyanate is an alkaline earth metal cyanate.

6. The process of claim 1 wherein the metal cyanate is potassium cyanate.

7. The process of claim 1 wherein the aprotic solvent is selected from the group consisting of dialkylamides, N-alkylpyrrolidones, hexa-alkyl phosphoramides.

8. The process of claim 4 wherein the reaction mixture contains from about 0.3 to about 3 moles of metal cyanate for each mole of halide contained in the organic polyhalide present in the reaction mixture.

9. The process of claim 1 wherein the organic polyhalide contains from about 1 to about 20 carbon atoms.

10. The process of claim 1 wherein the reaction mixture contains from 0.5 to 10 moles of water for each mole of halogen group present in the form of polyfunctional halides.

11. The process of claim 10 wherein the organic polyhalide is an alkyl polyhalide.

12. The process of claim 10 wherein the organic polyhalide is an aralkyl polyhalide.

13. The process of claim 10 wherein the organic polyhalide is a xylylene polyhalide.

14. The process of claim 1 wherein the reaction is conducted at a temperature of from about 25 to 300° C., the reaction mixture containing from about 0.3 to about 3 moles of metal cyanate for each mole of halide contained in the organic polyhalide present in the reaction mixture, wherein the reaction mixture contains from 0.5 to 10 moles of water for each mole of halogen group present in the form of polyfunctional halides, wherein the organic polyhalide is an alkyl polyhalide or an aralkyl polyhalide and the polyhalide contains from about 2 to about 20 carbon atoms.

15. The process of claim 14 wherein the organic polyhalide is a xylylene dichloride.

16. The process of claim 14 wherein the polyhalide is a polymethylene dichloride.

17. Organic polymers soluble in dimethylformamide, diethyl acetamide, N-alkyl pyrrolidones, N-methyl pyrrolidone, N-butyl pyrrolidone, hexamethylphosphoramide, tetramethyl urea, N,N-dimethyl-N, N'dipropyl, urea, dimethylsulfoxide, dimethylsulphone, or acetonitrile; said polymers comprising the reaction product of a poly-functional halide with an alkali metal cyanate and water, said polymers containing at least 0.1 weight percent urea groups, at least 0.1 weight percent biuret groups, and a total of at least 30 weight percent of both such groups.

18. Organic polymers of claim 17 wherein the polymer comprises the reaction product of p-xylene dichloride with NaOCN and water.

19. Organic polymers of claim 17 wherein the polymer comprises the reaction product of 1,4-dichloro-2-butene with an alkali metal cyanate and water.

20. The polymers of claim 17 wherein the polymer comprises the reaction product of 1,4-dichlorobutane with an alkali metal cyanate and water.

References Cited

UNITED STATES PATENTS

| | | | |
|---|---|---|---|
| 2,697,720 | 12/1954 | Kaiser | 260—482 |
| 2,852,494 | 9/1958 | Lehmann et al. | 260—77.5 |
| 2,866,801 | 12/1958 | Himel et al. | 260—453 |
| 3,023,228 | 2/1962 | Wagner et al. | 260—77.5 XR |
| 3,037,979 | 6/1962 | Fukui et al. | 260—248 |

(Other references on following page)

| | | | |
|---|---|---|---|
| 3,370,077 | 2/1968 | Hartzell | 260—77.5 XR |
| 3,379,687 | 4/1968 | Doss et al. | 260—47 |

OTHER REFERENCES

Saunders et al., Polyurethanes, Interscience, New York, 1962, Part I, p. 76, Part II, p. 304.

DONALD E. CZAJA, Primary Examiner

M. J. WELSH, Assistant Examiner

U.S. Cl. X.R.

117—161; 260—30.2, 30.6, 30.8, 32.4, 32.6